United States Patent
Chun et al.

(10) Patent No.: US 8,391,230 B2
(45) Date of Patent: Mar. 5, 2013

(54) METHOD AND APPARATUS FOR TRANSMITTING UPLINK CONTROL SIGNAL IN WIRELESS COMMUNICATION SYSTEM

(75) Inventors: Jin Young Chun, Seoul (KR); Jin Sam Kwak, Seoul (KR); Jin Soo Choi, Seoul (KR); Bin Chul Ihm, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/947,741

(22) Filed: Nov. 16, 2010

(65) Prior Publication Data
US 2011/0149890 A1    Jun. 23, 2011

Related U.S. Application Data

(60) Provisional application No. 61/287,706, filed on Dec. 18, 2009, provisional application No. 61/294,105, filed on Jan. 11, 2010.

(30) Foreign Application Priority Data

Apr. 8, 2010    (KR) .................... 10-2010-0032272

(51) Int. Cl.
    *H04W 4/00* (2009.01)
(52) U.S. Cl. .......................... 370/329; 708/250
(52) U.S. Cl. ..............................................................
(58) Field of Classification Search ............ 370/329; 708/250
    See application file for complete search history.

(56) References Cited

U.S. PATENT DOCUMENTS

| 2008/0102848 A1* | 5/2008 | Jung et al. ................. 455/450 |
| 2009/0070650 A1* | 3/2009 | Bourlas et al. .............. 714/748 |
| 2009/0207791 A1* | 8/2009 | Nakatsugawa ............... 370/329 |
| 2010/0169400 A1* | 7/2010 | Yang et al. .................. 708/250 |

FOREIGN PATENT DOCUMENTS

| EP | 2099248 | 9/2009 |
| KR | 1020080029734 | 4/2008 |
| KR | 1020090083487 | 8/2009 |
| KR | 1020090116627 | 11/2009 |

* cited by examiner

Primary Examiner — Dang Ton
Assistant Examiner — Wei Zhao
(74) Attorney, Agent, or Firm — Lee, Hong, Degerman, Kang & Waimey (57) ABSTRACT

A method and apparatus of transmitting an uplink control signal of a mobile station (MS) in a wireless communication system is provided. A mobile station (MS) receives resource allocation information of a first uplink control channel for transmitting an uplink synchronization signal and resource allocation information of a second uplink control channel. The MS allocates a first uplink control channel resource and a second uplink control channel resource to the first uplink control channel and the second uplink control channel respectively based on the resource allocation information of the first uplink control channel and the resource allocation information on the second uplink control channel and transmits an uplink control signal through at least one of the first uplink control channel and the second uplink control channel to a base station. The first uplink control channel resource is located in a first resource unit among a plurality of resource units constituting a logical resource region, and the first uplink control channel resource and the second uplink control resource are allocated in that order in the logical resource region.

9 Claims, 12 Drawing Sheets

METHOD AND APPARATUS FOR TRANSMITTING UPLINK CONTROL SIGNAL IN WIRELESS COMMUNICATION SYSTEM

CROSS-REFERENCE TO RELATED APPLICATIONS

Pursuant to 35 U.S.C. §119, this application claims the benefit of earlier filing date and right of priority to Korean Application No. 10-2010-0032272, filed on Apr. 8, 2010, and U.S. Provisional Application Ser. No. 61/287,706, filed on Dec. 18, 2009, and U.S. Provisional Application Ser. No. 61/294,105, filed on Jan. 11, 2010, the contents of which are hereby incorporated by reference herein in their entirety.

BACKGROUND OF THE INVENTION

1. Field of the Invention

The present invention relates to wireless communications, and more particularly, to a method and apparatus for transmitting an uplink control signal in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

Since an Institute of electrical and electronics engineers (IEEE) 802.16m system has backward compatibility, the IEEE 802.16m system can support not only a mobile station (MS) for the IEEE 802.1m system (hereinafter, a 16m MS) but also an MS for an IEEE 802.1e system (hereinafter, a 16e MS). When the IEEE 802.1m system supports the 16e MS, this can be referred to as a legacy support mode. An uplink control channel of the legacy support mode may have a different configuration from an uplink control channel of a 16m only mode which supports only the 16m MS.

SUMMARY OF THE INVENTION

The present invention provides a method and apparatus for transmitting an uplink control signal in a wireless communication system.

In an aspect, a method of transmitting an uplink control signal of a mobile station (MS) in a wireless communication system is provided. The method include receiving resource allocation information of a first uplink control channel for transmitting an uplink synchronization signal, receiving resource allocation information of a second uplink control channel, allocating a first uplink control channel resource and a second uplink control channel resource to the first uplink control channel and the second uplink control channel respectively based on the resource allocation information of the first uplink control channel and the resource allocation information on the second uplink control channel, transmitting an uplink control signal through at least one of the first uplink control channel and the second uplink control channel to a base station, wherein the first uplink control channel resource is located in a first resource unit among a plurality of resource units constituting a logical resource region, and the first uplink control channel resource and the second uplink control channel resource are allocated in that order in the logical resource region.

An index of the second uplink control channel resource may be greater than an index of the first uplink control channel resource.

The second uplink control channel may include a feedback channel for transmitting an uplink feedback and a bandwidth request channel (BRCH) for transmitting a bandwidth request signal, and an index of a resource allocated to the feedback channel may be less than an index of a resource allocated to the BRCH in the logical resource region. The feedback channel may include an HARQ feedback channel (HFBCH) for transmitting a hybrid automatic repeat request (HARQ) feedback and a fast feedback channel (FFBCH) for transmitting a channel quality indicator (CQI) or multiple-input multiple-output (MIMO) information, and an index of a resource allocated to the HFBCH may be less than an index of a resource allocated to the FFBCH in the logical resource region.

The resource allocation information of the first uplink control channel and the resource allocation information of the second uplink control channel may be broadcast.

The resource allocation information of the first uplink control channel may be transmitted with a period of 40 ms.

The resource allocation information of the second uplink control channel may be transmitted either with a period of 160 ms or a period of 320 ms.

Each of the resource units may include 6 tiles, each of which comprises 4 consecutive subcarriers and 6 orthogonal frequency division multiple access (OFDMA) symbols.

The method may further include allocating an uplink data region to the logical resource region remaining after allocating the first uplink control channel resource and the second uplink control channel resource, and transmitting uplink data mapped to the uplink data region to the base station.

In another aspect, an apparatus for transmitting an uplink control channel in a wireless communication system is provided. The apparatus include a receive circuit for receiving allocation information of a first uplink control channel and allocation information of a second uplink control channel from a base station and for transmitting an uplink control signal through at least one of the first uplink control channel and the second uplink control channel, and a processor coupled to the receive circuit and configured to allocate a first uplink control channel resource and a second uplink control resource to the first uplink control channel and the second uplink control channel based on the resource allocation information of the first uplink control channel and the resource allocation information on the second uplink control channel, wherein the first uplink control channel resource is located in a first resource unit among a plurality of resource units constituting a logical resource region, and the first uplink control channel resource and the second uplink control channel resource are allocated in that order in the logical resource region.

An index of the second uplink control channel resource may be greater than an index of the first uplink control channel resource.

The second uplink control channel may include a feedback channel for transmitting an uplink feedback and a bandwidth request channel (BRCH) for transmitting a bandwidth request signal, and an index of a resource allocated to the feedback channel may be less than an index of a resource allocated to the BRCH in the logical resource region.

The feedback channel may include an HARQ feedback channel (HFBCH) for transmitting a hybrid automatic request (HARQ) feedback and a fast feedback channel (FFBCH) for transmitting a channel quality indicator (CQI) or multiple input multiple output (MIMO) information, and wherein an index of a resource allocated to the HFBCH may be less than an index of a resource allocated to the FFBCH in the logical resource region.

The resource allocation information of the first uplink control channel and the resource allocation information of the second uplink control channel may be broadcast.

Each of the resource units may include 6 tiles, each of which comprises 4 consecutive subcarriers and 6 orthogonal frequency division multiple access (OFDMA) symbols.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or evolved UTRA (E-UTRA). IEEE 802.1*m* is the evolution of IEEE 802.1*e*, and it provides a backward compatibility with an IEEE 802.1*e*-based system. UTRA is part of a universal mobile telecommunications system (UMTS). 3rd generation partnership project (3GPP) long term evolution (LET) is part of evolved UMTS (E-UMTS) using evolved-UMTS terrestrial radio access (E-UTRA), and it adopts OFDMA in downlink (DL) and SC-FDMA in uplink (UL). LTE-A (Advanced) is the evolution of 3GPP LTE.

IEEE 802.1*m* is chiefly described as an example in order to clarify the description, but the technical spirit of the present invention is not limited to IEEE 802.1*e*.

Figure 1:
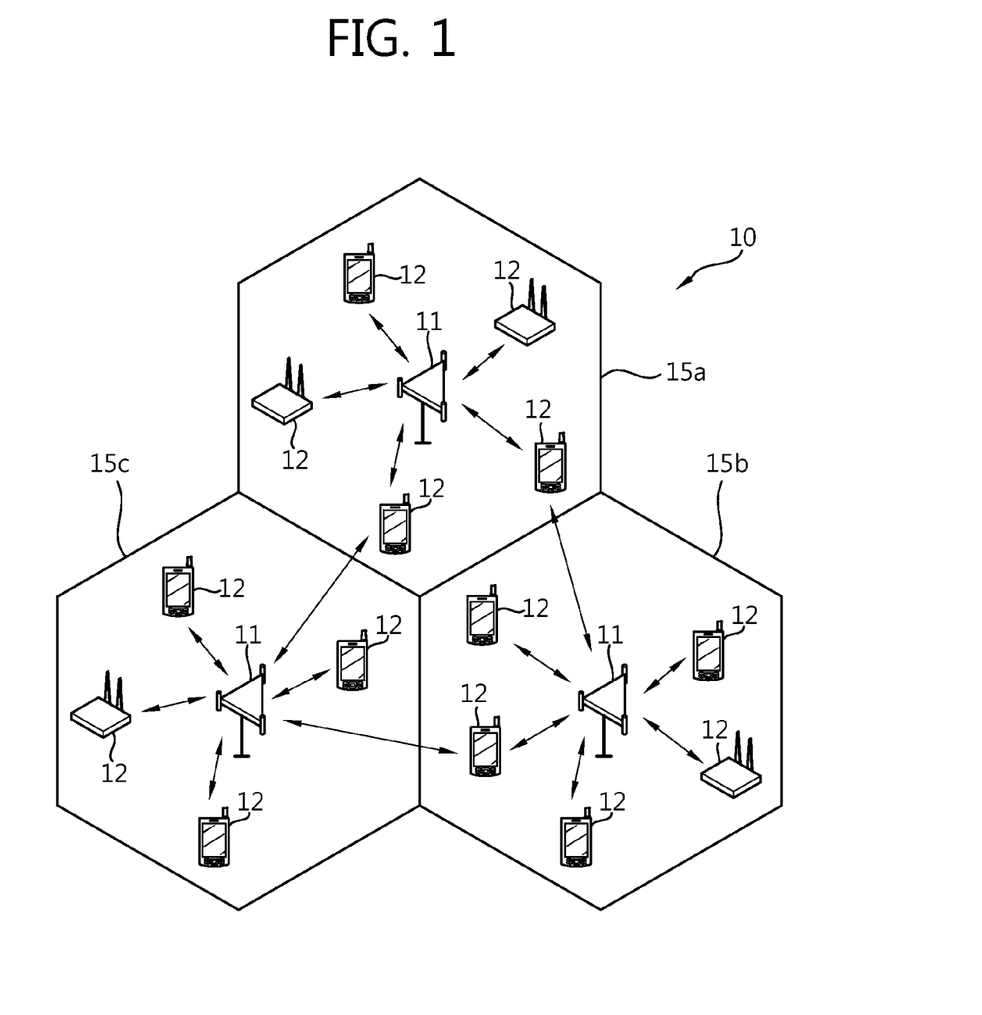
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15*a*, 15*b*, and 15*c*, Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
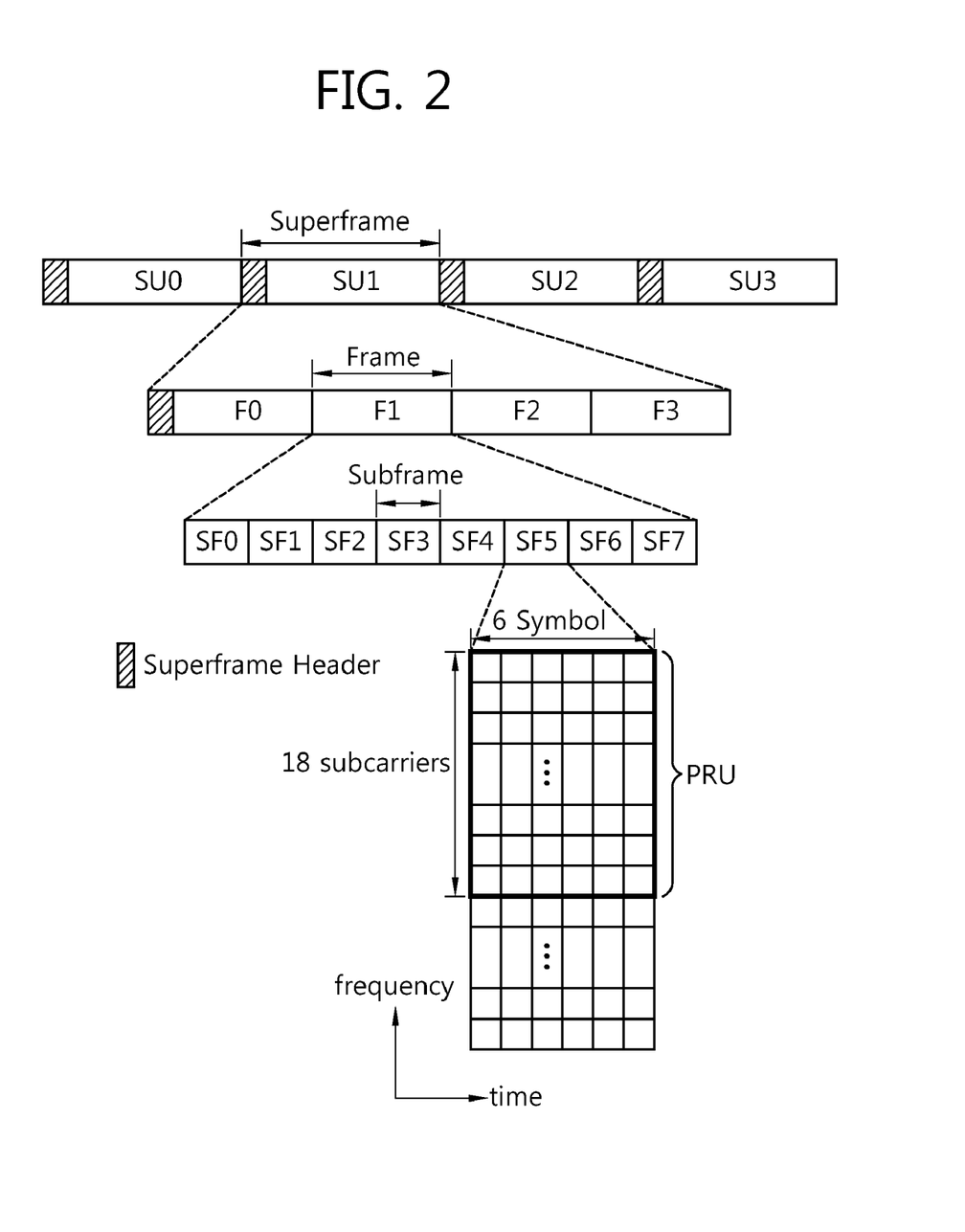
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDMA symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

Figure 3:
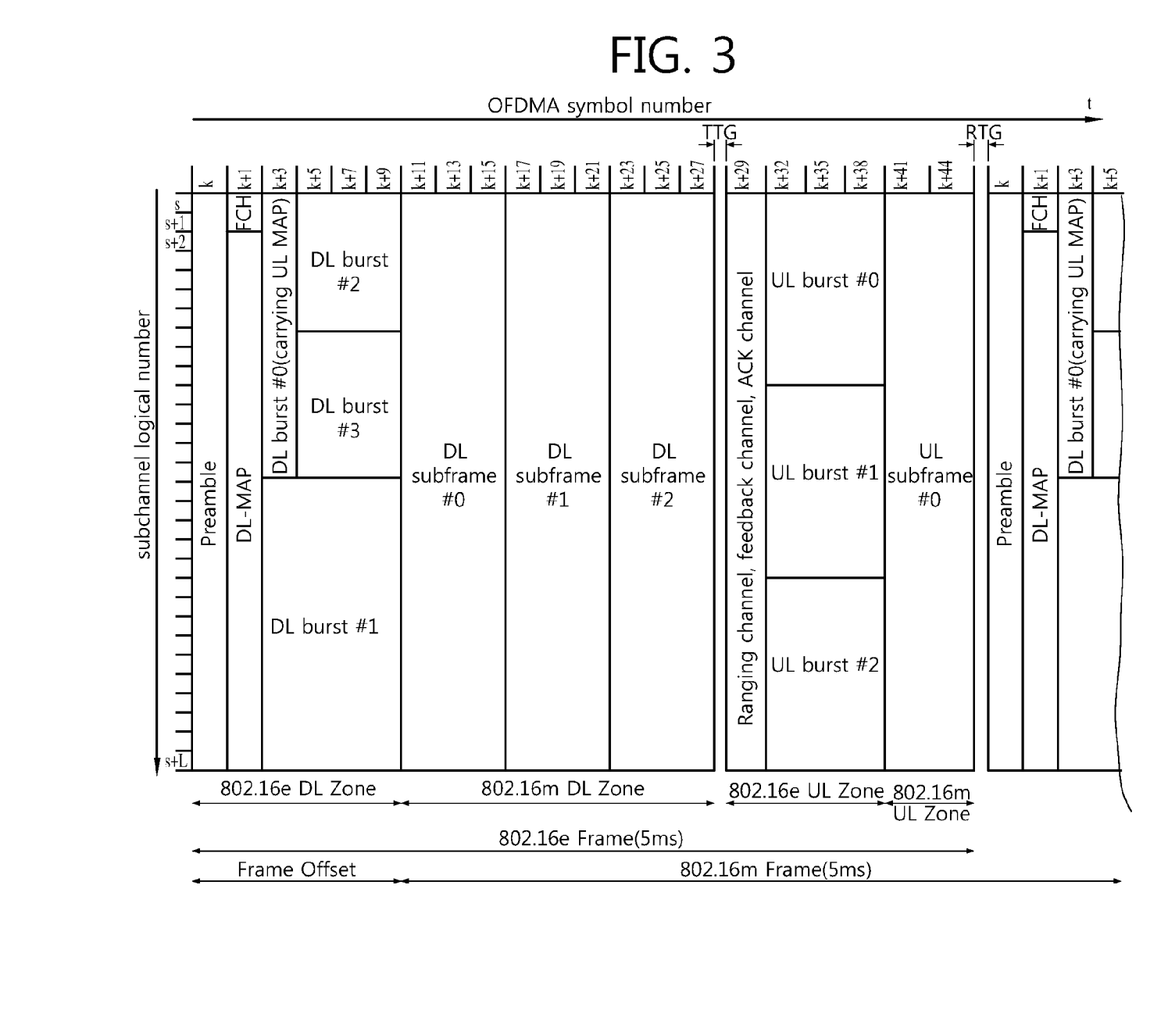
FIG. 3 shows another example of a frame structure.

FIG. 3 shows another example of a frame structure. The frame structure of FIG. 3 is a TDD frame structure in the legacy support mode in which not only an MS supporting an IEEE 802.1*m* system (hereinafter referred to as a '16*m* AMS'), but also an MS supporting an IEEE 802.1*e* system (hereinafter referred to as a '16*e* MS') is supported.

Referring to FIG. 3, the frame includes a DL subframe and an UL subframe. The DL subframe is anterior to the UL subframe in term of the time. The DL subframe is started in order of a preamble, a frame control header (FCH), a DL-MAP, an UL-MAP, and a burst region. The UL subframe includes an uplink control channel such as a feedback channel or a ranging channel, a burst region, and so on. A guard time for distinguishing the DL subframe and the UL subframe from each other is inserted into the middle part (between the DL subframe and the UL subframe) and the last part (subsequent to the UL subframe) of the frame. A transmit/receive transition gap (TTG) is a gap between a DL burst and a subsequent UL burst. A receive/transmit transition gap (RTG) is a gap between an UL burst and a subsequent DL burst. A DL region and an UL region are divided into a region for a 16*e* MS and a region for a 16*m* AMS. In the DL region, the preamble, the FCH, DL-MAP, the UL-MAP, and the DL burst region are regions for the 16*e* MS, and the remaining DL regions are regions for the 16*m* AMS. In the UL region, the uplink control channel and the UL burst region are regions for the 16*e* MS, and the remaining UL regions are regions for the 16*m* AMS. In the UL region, the regions for the 16*e* MS and the regions for the 16*m* AMS can be multiplexed in various ways. In FIG. 3, the UL region is illustrated to be multiplexed according to the TDM scheme, but the present invention is not limited thereto. For example, the UL region can be multiplexed according to the FDM scheme.

The preamble is used for initial synchronization between a BS and an MS, cell search, frequency offset, and channel estimation. The FCH includes information about the length of a DL-MAP message and the coding scheme of a DL-MAP. The DL-MAP is a region in which the DL-MAP message is transmitted. The DL-MAP message is used to define access to a DL channel. This means that the DL-MAP message defines instruction information or control information or both about the DL channel. The DL-MAP message includes the configuration change count of a downlink channel descriptor (DCD) and a BS identifier (ID). The DCD describes a DL burst profile currently applied to a map. The DL burst profile refers to the characteristic of a DL physical channel, and the DCD is periodically transmitted by a BS through a DCD message. The UL-MAP is a region in which an UL-MAP message is transmitted. The UL-MAP message defines access to an UL channel. This means that the UL-MAP message defines instruction information or control information or both about the UL channel. The UL-MAP message includes the configuration change count of an uplink channel descriptor (UCD) and an UL allocation start time defined by the UL-MAP. The UCD describes an UL burst profile. The UL burst profile refers to the characteristic of an UL physical channel. The UCD is periodically transmitted by a BS through an UCD message. The DL burst is a region in which data are transmitted from a BS to an MS, and the UL burst is a region in which data are transmitted from an MS to a BS. The fast feedback region is included in the UL burst region of an OFDM frame. The fast feedback region is used to transmit information requiring fast response to a BS. The fast feedback region can be used for CQI transmission. The position of the fast feedback region is determined by the UL-MAP. The position of the fast feedback region can be a fixed position or a variable position within the OFDM frame.

A superframe header (SFH) can carry an essential system parameter and system configuration information. The SFH may be located in a first subframe of a superframe. The SFH may occupy last 5 Orthogonal Frequency-Division Multiple Access (OFDMA) symbols of the first subframe. The SFH can be classified into a primary-SFH (P-SFH) and a secondary-SFH (S-SFH). The P-SFH and the S-SFH can be transmitted in every superframe. The S-SFH can be transmitted in two consecutive superframes. Information transmitted on the S-SFH can be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP1 may include information on a ranging channel, resource mapping information such as subband partitioning and frequency partitioning, legacy support information for the support of an IEEE 802.1e mobile station (MS), etc. The S-SFH SP2 includes information on initial network entry and network discovery. The S-SFH SP3 includes other important system information.

Figure 4:
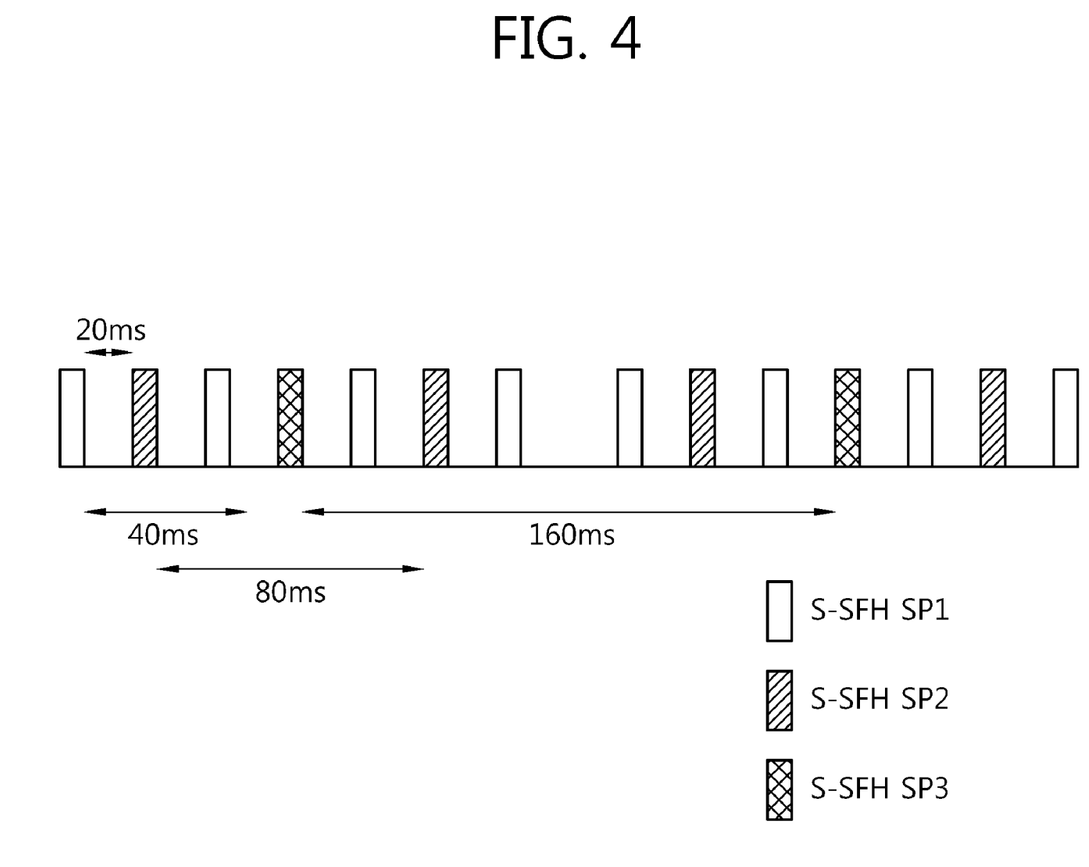
FIG. 4 shows an example of a transmission period of an S-SFH.

FIG. 4 shows an example of a transmission period of an S-SFH. S-SFHs SP1, SP2, and SP3 may be transmitted in different periods. Since information transmitted using the S-SFH SP1 has the highest importance, the S-SFH SP1 may be transmitted with the shortest period, and the S-SFH SP3 may be transmitted with the longest period. The transmission periods of the S-SFHs SP1, SP2, and SP3 may be respectively 40 ms, 80 ms, and 160 ms (or 320 ms). The transmission periods of the S-SFHs SP1, SP2, and SP3 may be indicated by an SP scheduling periodicity information field of the S-SFH SP3.

Figure 5:
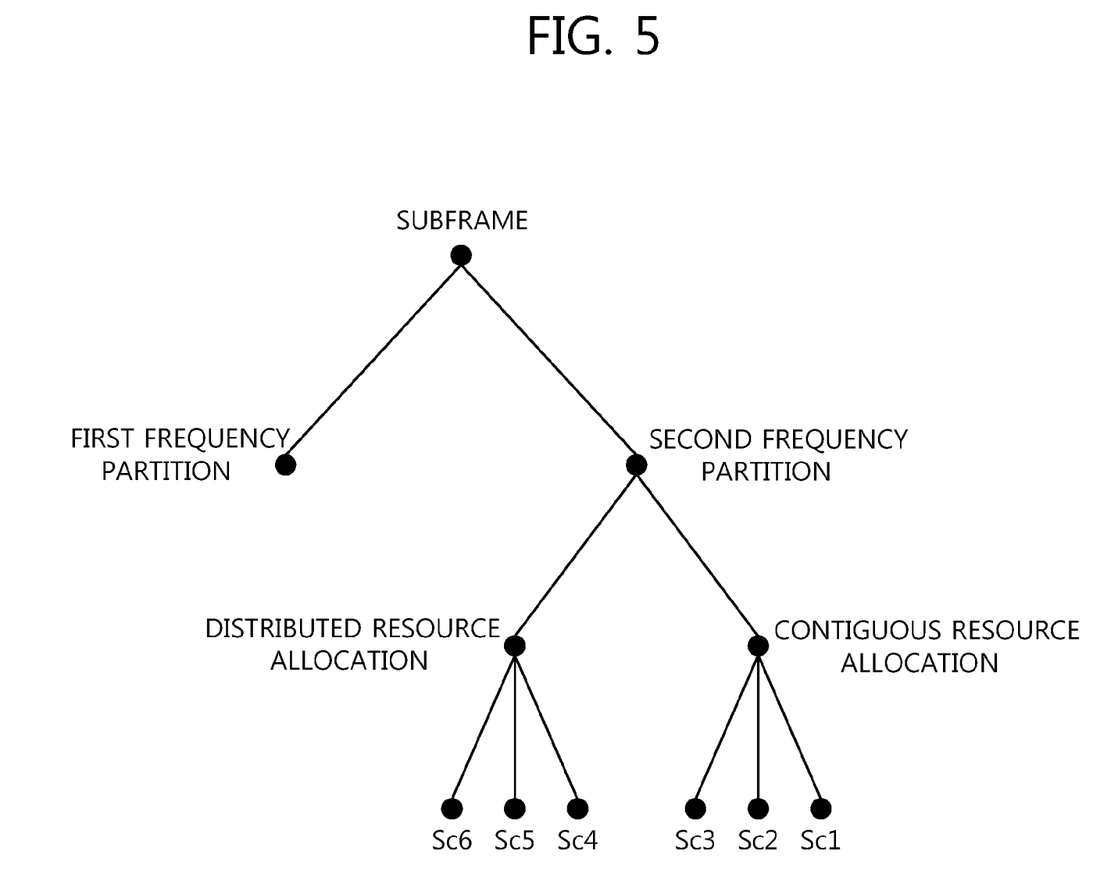
FIG. 5 shows an example of an uplink radio resource.

FIG. 5 shows an example of an uplink radio resource.

Each uplink subframe can be divided into 4 or less frequency partitions. Although a subframe is divided into two frequency partitions (i.e., FP1 and FP2) in FIG. 3, this is for exemplary purposes only, and thus the number of frequency partitions in the subframe is not limited thereto. Each frequency partition consists of at least one physical resource unit (PRU) across all available orthogonal frequency division multiple access (OFDMA) symbols in the subframe. In addition, each frequency partition may include contiguous/localized and/or distributed PRUs. Each frequency partition may be used for other purposes such as fractional frequency reuse (FFR). The second frequency partition (i.e., FP2) of FIG. 3 includes both contiguous resource allocation and distributed resource allocation. 'Sc' denotes a subcarrier.

The PRU is a basic physical unit for resource allocation, and includes Psc contiguous subcarriers and Nsym contiguous OFDMA symbols. Psc may be 18. Nsym may be equal to the number of OFDMA symbols included in one subframe. Therefore, Nsym may be determined according to a subframe type. For example, when one subframe consists of 6 OFDMA symbols, the PRU can be defined with 18 subcarriers and 6 OFDMA symbols. A logical resource unit (LRU) is a basic logical unit for distributed and contiguous resource allocations.

A distributed logical resource unit (DLRU) can be used to obtain a frequency diversity gain. An uplink DLRU may consist of subcarriers included in 3 tiles distributed in one frequency partition. The tile is a basic unit of constituting the uplink DLRU. A size of an uplink tile may be 6*Nsym, where Nsym may vary depending on the subframe type.

A contiguous logical resource unit (CLRU) can be used to obtain a frequency selective scheduling gain. The CLRU includes a group of contiguous subcarriers in a resource allocated in a localized manner. The CLRU consists of a data subcarrier in a contiguous resource unit (CRU). The CRU has the same size as the PRU.

Figure 6:
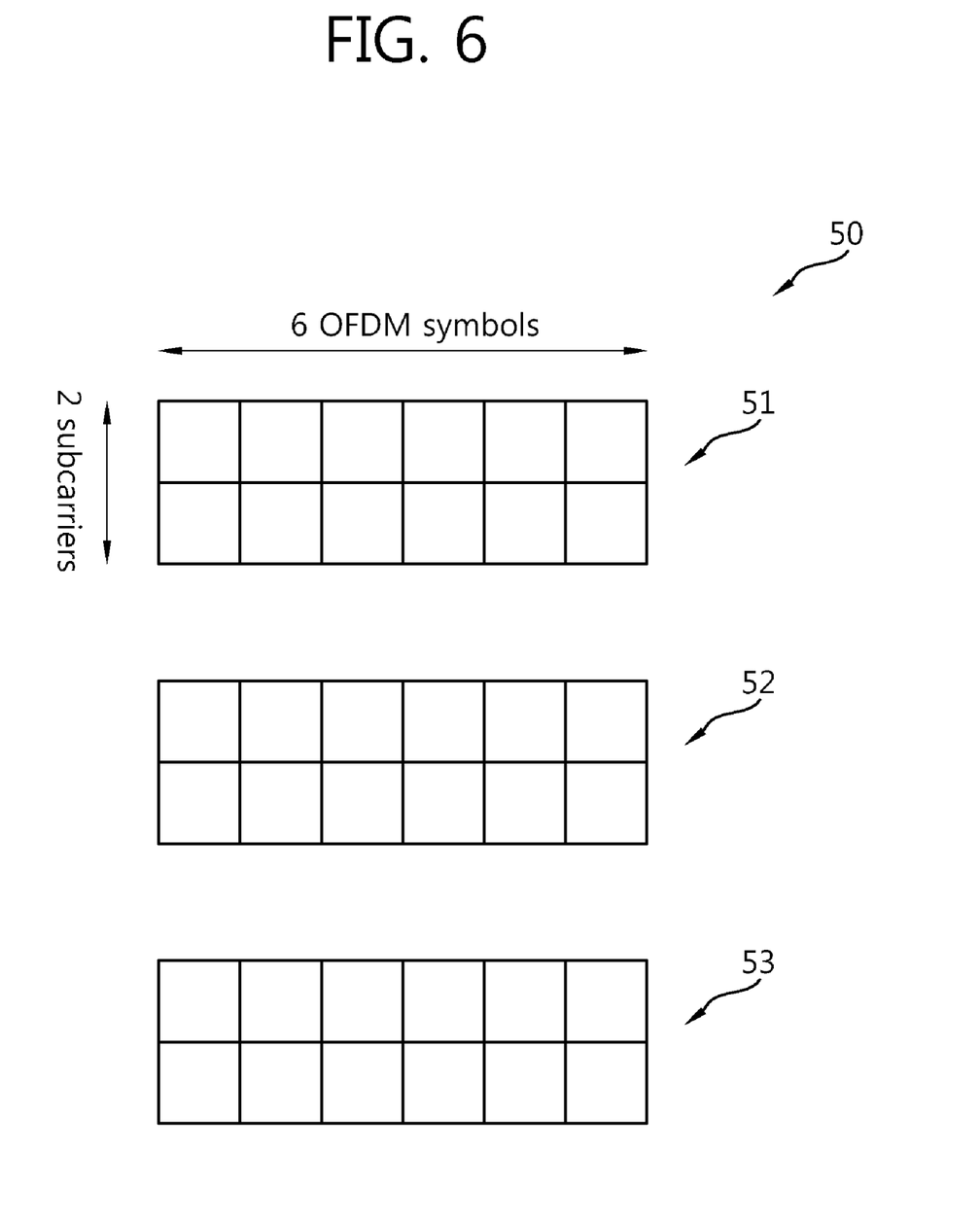
FIG. 6 shows an example of a resource unit used for an uplink control channel in an IEEE 802.1*m* system.

FIG. 6 shows an example of a resource unit used for an uplink control channel in an IEEE 802.1m system. A resource unit 50 is a resource allocation unit used for transmission of an uplink control channel, and is also referred to as a tile. The tile 50 may be a physical resource allocation unit or a logical resource allocation unit. The control channel includes at least one tile 50, and the tile 50 consists of at least one frequency-domain subcarrier over at least one time-domain OFDMA symbol. The tile 50 denotes an aggregation of a plurality of subcarriers contiguous along a time domain and a frequency domain. The tile 50 includes a plurality of data subcarriers and/or pilot subcarriers. A sequence of a control signal may be mapped to the data subcarrier, and a pilot for channel estimation may be mapped to the pilot subcarrier.

The tile 50 includes three mini units 51, 52, and 53. The mini unit is also referred to as a mini tile. The tile 50 may consist of a plurality of mini tiles. The mini tile may consist of at least one frequency-domain subcarrier over at least one time-domain OFDMA symbol. Each of the mini tiles 51, 52, and 53 includes two contiguous subcarriers throughout 6 OFDMA symbols. The mini tiles 51, 52, and 53 included in the tile 50 may not be contiguous to one another in the frequency domain. This implies that at least one mini tile of another tile may be located between the $1^{st}$ mini tile 51 and the $2^{nd}$ mini tile 52 and/or between the $2^{nd}$ mini tile 52 and the $3^{rd}$ mini tile 53. Frequency diversity can be obtained by locating the mini tiles 51, 52, and 53 included in the tile 50 in a distributive manner.

The number of time-domain OFDMA symbols and/or the number of frequency-domain subcarriers included in the mini tile are for exemplary purposes only, and thus the present invention is not limited thereto. The mini tile may include a plurality of subcarriers throughout a plurality of OFDMA symbols. The number of OFDMA symbols included in the mini tile may differ according to the number of OFDMA symbols included in a subframe. For example, if the number of OFDMA symbols included in one subframe is 6, the number of OFDMA symbols included in a mini tile may be 6.

The OFDMA symbol denotes a duration in the time domain, and is not necessarily limited to an OFDM/OFDMA-based system. The OFDMA symbol may also referred to as other terms such as a symbol duration. Technical features of the present invention are not limited to a specific multiple access scheme by the term of the OFDMA symbol. In addition, the subcarrier denotes an allocation unit in the frequency domain. Although one subcarrier is used for this unit herein, a subcarrier set unit may be used.

Figure 7:
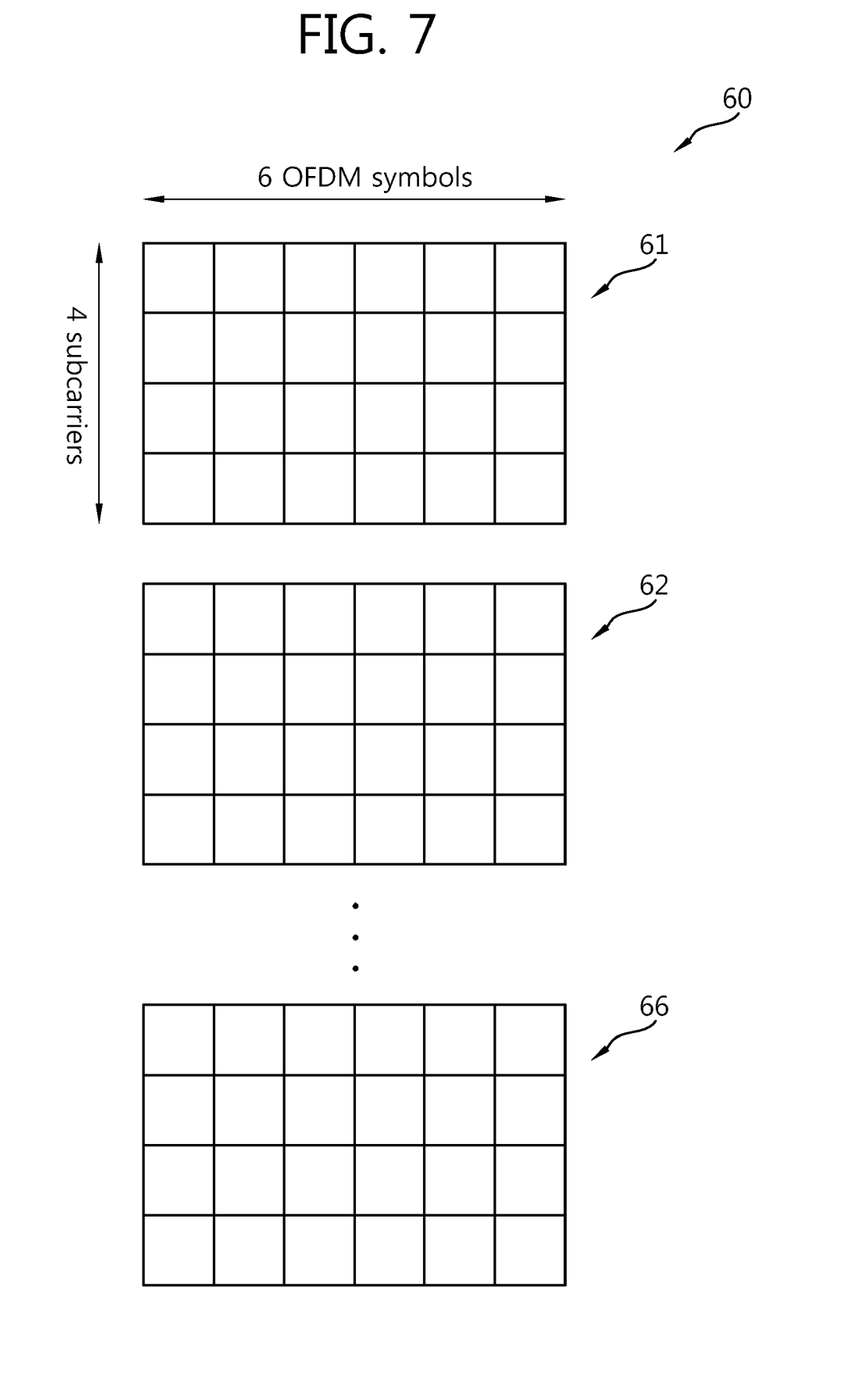
FIG. 7 shows an example of a resource block in a partial usage of subchannel (PUSC) region based on a frequency division multiplexing (FDM) scheme in a legacy support mode.

FIG. 7 shows an example of a resource block in a partial usage of subchannel (PUSC) region based on a frequency division multiplexing (FDM) scheme in a legacy support mode. A resource block 60 consists of 6 tiles. The resource block 60 may be a DLRU. Each of the six tiles 61, 62, 63, 64, 65, and 66 constituting the resource block 60 includes 4 contiguous subcarriers across 6 OFDMA symbols. The tiles 61, 62, 63, 64, 65, and 66 included in the resource block 60 can be distributed from one another by a permutation rule of an 802.1e region in a frequency domain. A frequency diversity can be obtained by deploying the tiles 61, 62, 63, 64, 65, and 66 included in the resource block 60 in a distributive manner in the frequency domain. A plurality of resource blocks constructed as described above are logically sorted in the resource region according to an order indicated by the permutation rule of the 802.1m region. Some of the plurality of resource blocks can be used in an 802.1m region, and some of them can be used in the 802.1e region.

A control channel is designed by taking the following points into consideration.

(1) A plurality of tiles included in a control channel can be distributed over the time domain or the frequency domain in order to obtain a frequency diversity gain. For example, assuming that a DRU includes three tiles each including six consecutive subcarriers on six OFDM symbols, the control channel includes the three tiles, and each of the tiles can be distributed over the frequency domain or the time domain. In some embodiments, the control channel can include at least one tile including a plurality of mini-tiles, and the plurality of mini-tiles can be distributed over the frequency domain or the time domain. For example, the mini-tile can consist of (OFDM symbols×subcarriers)=6×6, 3×6, 2×6, 1×6, 6×3, 6×2, 6×1 or the like. Assuming that a control channel, including (OFDM symbols x subcarriers) of IEEE 802.1$e$=the tiles of a 3×4 PUSC structure, and a control channel, including mini-tiles, are multiplexed through a Frequency Division Multiplexing (FDM) method, the mini-tiles can consist of (OFDM symbols×subcarriers)=6×2, 6×1, etc. When taking only the control channel, including the mini-tiles, into consideration, the mini-tiles can consist of (OFDM symbols× subcarriers)=6×2, 33×6, 2×6, 1×6 or the like.

(2) To support a high-speed mobile station, the number of OFDM symbols constituting a control channel must be a minimum. For example, in order to support a mobile station moving at the speed of 350 km/h, the number of OFDM symbols constituting a control channel is properly 3 or less.

(3) The transmission power of a mobile station per symbol is limited. To increase the transmission power of a mobile station per symbol, it is advantageous to increase the number of OFDM symbols constituting a control channel. Accordingly, a proper number of OFDM symbols has to be determined with consideration taken of (2) a high-speed mobile station and (3) the transmission power of a mobile station per symbol.

(4) For coherent detection, pilot subcarriers for channel estimation have to be uniformly distributed over the time domain or the frequency domain. The coherent detection method is used to perform channel estimation using a pilot and then find data loaded on data subcarriers. For the power boosting of pilot subcarriers, the number of pilots per OFDM symbol of a control channel has to be identical in order to maintain the same transmission power per symbol.

(5) For non-coherent detection, a control signal has to consist of orthogonal codes/sequences or semi-orthogonal codes/sequences or has to be spread.

Examples of the uplink control channel used in the IEEE 802.1$m$ system include a fast feedback channel (FFBCH), a hybrid automatic repeat request (HARD) feedback control channel (HFBCH), a sounding channel, a ranging channel, a bandwidth request channel (BRCH), etc. The FFBCH carries a feedback of CQI and/or MIMO information, and is classified into two types, i.e., a primary fast feedback channel (PFBCH) and a secondary fast feedback channel (SFBCH). The PFBCH carries 4 to 6-bit information, and provides a wideband CQI and/or a MIMO feedback. The SFBCH carries 7 to 24-bit information, and provides a narrowband CQI and/or a MIMO feedback. The SFBCH can support a larger number of control information bits by using a high code rate. The PFBCH supports non-coherent detection not using a reference signal. The SFBCH supports coherent detection using the reference signal. The FFBCH may be assigned to a predetermined location defined in a broadcast message. The FFBCH may be assigned periodically to an MS. Feedback information of a plurality of MSs may be transmitted through the FFBCH by performing multiplexing according to time division multiplexing (TDM), frequency division multiplexing (FDM), and code division multiplexing (CDM). The FFBCH through which an ACK/NACK signal is transmitted in response to data to which an HARQ scheme is applied may start at a pre-defined offset from data transmission.

The BRCH is a channel requesting radio resources for transmitting uplink data or a control signal which will be transmitted by a mobile station. The HARQ feedback channel is a channel for transmitting ACK/NACK signals in response to data transmission. The FFBCH, the BRCH, the HARQ feedback channel, etc. can be placed anywhere in an uplink subframe or frame.

In general, when an uplink control channel is allocated for transmission of an uplink control signal, whether to allocate the uplink control channel can be determined for each fractional frequency reuse (FFR) region. However, if the uplink control channel is allocated to all FFR regions, signaling overhead may occur in channel allocation. In addition, a frequency partitioning method may differ between downlink and uplink, and in this case, confusion may occur in the allocation of the uplink control channel. Therefore, a base station (BS) can determine the FFR region to which the uplink control channel is allocated by using broadcast information such as a size of the uplink control channel. For example, a bandwidth request channel (BRCH) of which the number of channels is not necessarily large enough to allocate to all FFR regions and which cannot perform power control can be allocated only one FFR region. In addition, a fast feedback channel (FFBCH), a hybrid automatic repeat request (HARQ) feedback control channel (HFBCH), or the like that can perform power control can be allocated to all FFR regions, or whether to allocate it or not can be determined for each region.

A plurality of uplink control channels can be allocated to a DLRU of each uplink frequency partition. The plurality of uplink control channels may include a feedback channel, a BRCH, etc. The feedback channel may include an FFBCH and an HFBCH. When uplink data and the uplink control channels are allocated to the uplink frequency partitions, they can be allocated in the order of the HFBCH, the FFBCH, the BRCH, and the uplink data. Such a configuration of the uplink control channels can apply to both the 16$m$ only mode and the legacy support mode.

Meanwhile, in the 16$m$ only mode, the ranging channel can be allocated to a contiguous logical resource unit (CLRU) among the uplink control channels. In the legacy support mode, the ranging channel can be allocated to the DLRU. Therefore, there is a need for a method of configuring the uplink control channel including the ranging channel when the uplink control channel is configured in the legacy support mode.

Figure 8:
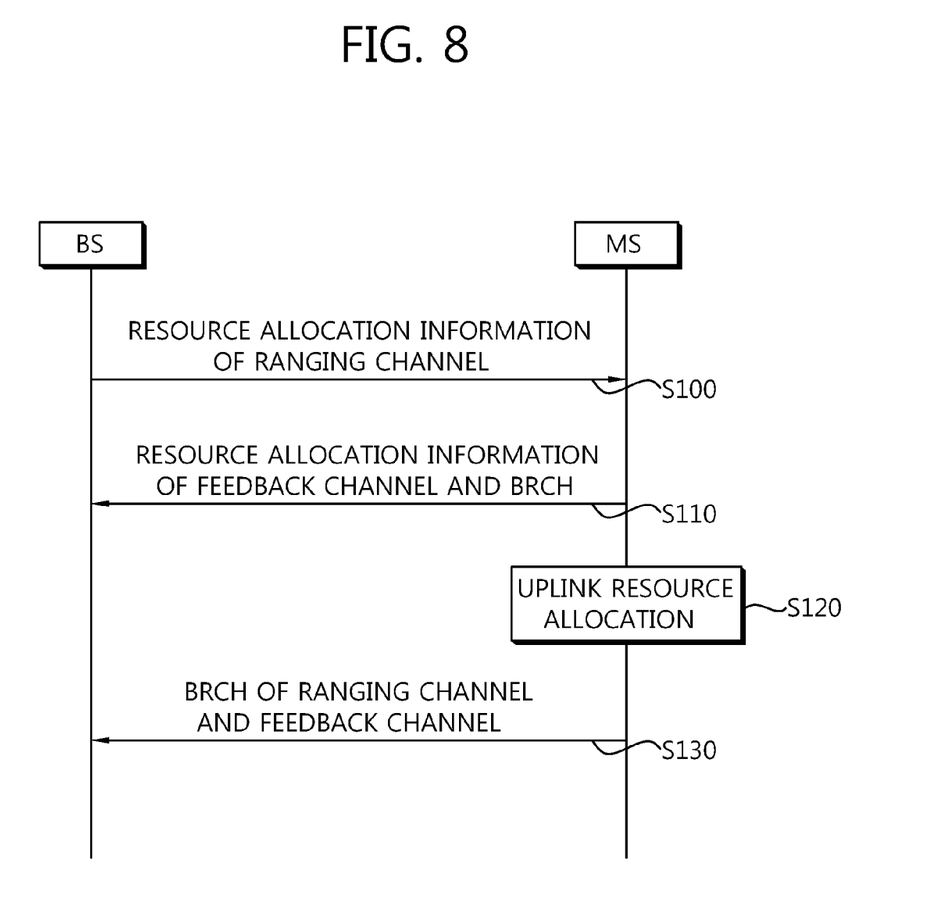
FIG. 8 shows an uplink control signal transmission method according to an embodiment of the present invention.

FIG. 8 shows an uplink control signal transmission method according to an embodiment of the present invention.

In step S100, a BS transmits resource allocation information of a ranging channel to an MS. In step S110, the BS transmits resource allocation information of a feedback channel and a BRCH to the MS. In step S120, uplink resources are allocated to the ranging channel, the feedback channel, and the BRCH according to the resource allocation information of the ranging channel and the resource allocation information of the feedback channel and the BRCH. In step S130, the MS transmits an uplink control signal through at least one of the ranging channel, the feedback channel, and the BRCH.

Since the ranging channel is a channel for initial network entry of the MS, the MS needs to receive and read information on the ranging channel as quickly as possible. Therefore, the resource allocation information of the ranging channel can be transmitted by using a secondary-super frame header (S-SFH) SP1 transmitted with a shortest period among S-SFHs. The feedback channel may include an FFBCH and an HFBCH. The feedback channel and the BRCH do not frequently change and are not much necessary to be received and read in comparison with the ranging channel, and thus the resource allocation information of the feedback channel and the BRCH can be transmitted by using an S-SFH SP3 transmitted with a longest period among the S-SFHs.

In addition, as to a location of the ranging channel on a region resource, the MS has to be able to receive the S-SFH SP1 and know the location directly irrespective of other control channels or a data region. That is, when an uplink resource is allocated to the uplink control channel, the ranging channel can function as a reference uplink control channel. The uplink resource may be allocated first to the ranging channel, and a neighboring uplink resource may be subsequently allocated to other control channels such as the feedback channel, the BRCH, etc. In a region for the 16m MS (hereinafter, a 16m region), the uplink resource may be a DLRU.

Figure 9:
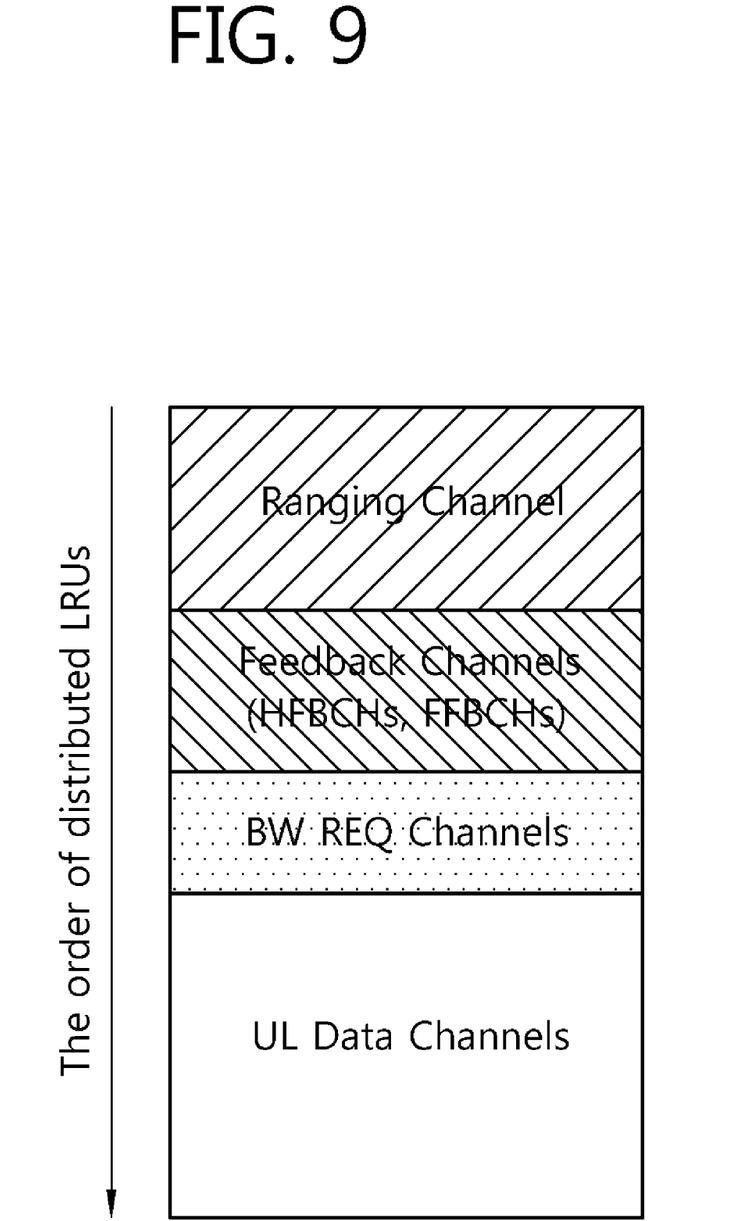
FIG. 9 shows an example of configuring an uplink control channel according to the proposed uplink control signal transmission method.

FIG. 9 shows an example of configuring an uplink control channel according to the proposed uplink control signal transmission method. A ranging channel is allocated from a first DLRU among uplink resources in a legacy support mode. Subsequent DLRUs are sequentially allocated to a feedback channel, a BRCH, and a data region in increasing order of indices. Respective control channels may be contiguous with one another on a logical resource region.

Figure 10:
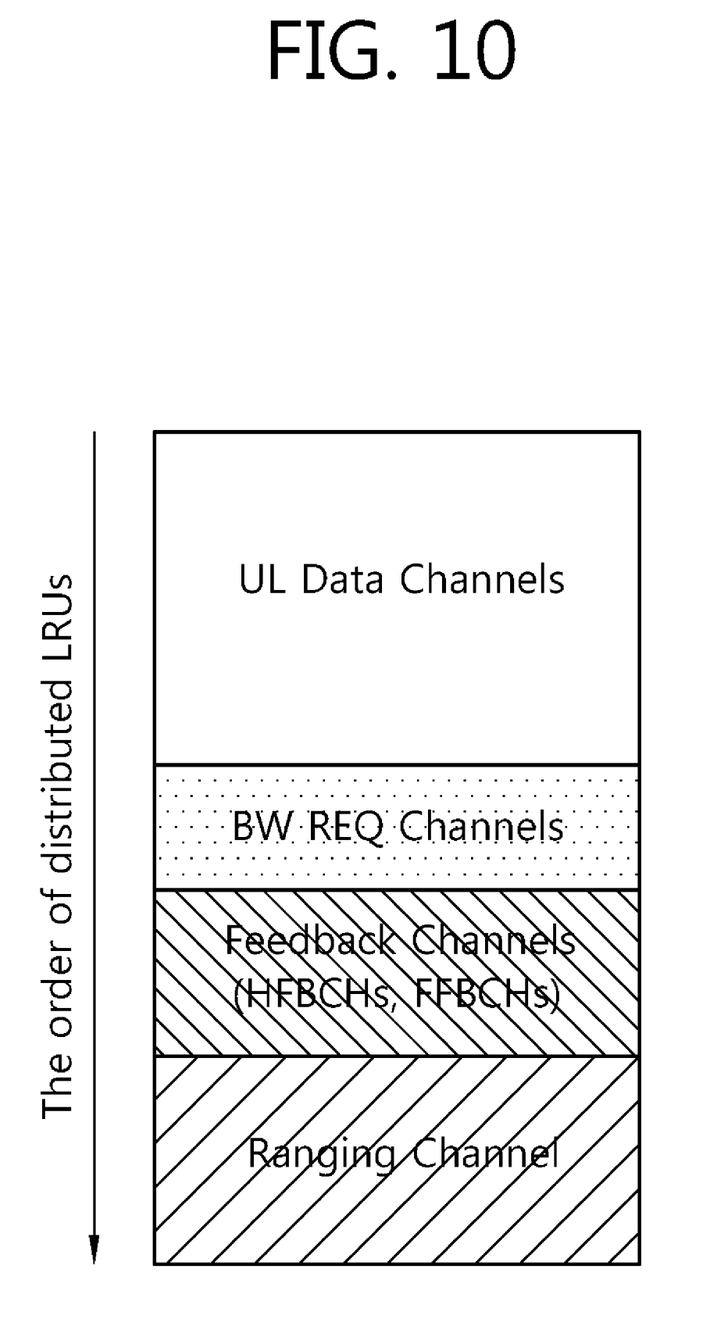
FIG. 10 shows another example of configuring an uplink control channel according to the proposed uplink control signal transmission method.

FIG. 10 shows another example of configuring an uplink control channel according to the proposed uplink control signal transmission method. A ranging channel is allocated from a last DLRU among uplink resources in a legacy support mode. Subsequent DLRUs are sequentially allocated to a feedback channel, a BRCH, and a data region in decreasing order of indices. Respective control channels may be contiguous with one another on a logical resource region.

In the configuration of the uplink control channel of FIG. 9 and FIG. 10, a region for the 16e MS (hereinafter, a 16e region) and the 16m region are multiplexed using different FDM schemes in an uplink subframe, and when a boundary thereof is transmitted by using an S-SFH SP1, the MS can find a first or last DLRU irrespective of the configuration of the 16e region. In addition, even in a case where the boundary thereof is not transmitted or is transmitted not by using the S-SFH SP1, the uplink control channel has to be deployed such that the MS can know the first or last DLRU irrespective of the configuration of the 16e region. That is, since 16m MSs know a permutation rule of the 16e region, the 16m MSs can know a location of the uplink control channel without having to know information on the boundary by mapping a first or last subchannel of the 16e region to a first or last DLRU of the 16m region.

Figure 11:
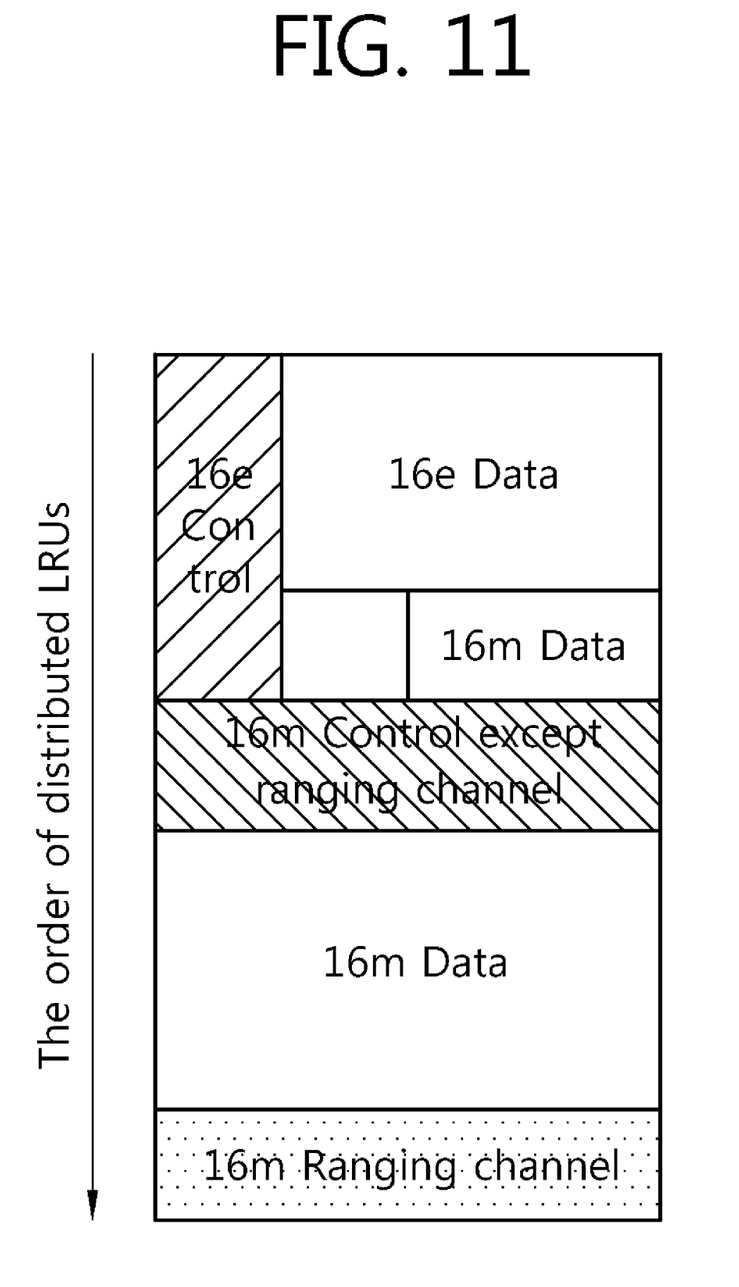
FIG. 11 shows another example of configuring an uplink control channel according to the proposed uplink control signal transmission method.

FIG. 11 shows another example of configuring an uplink control channel according to the proposed uplink control signal transmission method. The example of FIG. 11 can apply to a case where an MS knows allocation information of an uplink control channel of an IEEE 802.1e system.

In an uplink resource region, a part having a small subchannel index is used as a 16e region. First three OFDMA symbols are used as an uplink control channel of the IEEE 802.1e system. In the 16e region, the remaining parts except for a part to which the uplink control channel is allocated are used as a region for 16e data and 16m data. An empty region in which no data is transmitted may exist as shown in FIG. 11. This is because the 16m data is allocated in a subframe unit. The empty region can be used for transmission of the 16e data.

The uplink control channel of the IEEE 802.1m system can be allocated while avoiding overlapping with a resource region to which the uplink control channel of the IEEE 802.1e system and the ranging channel of the IEEE 802.1m system are allocated. The uplink control channel of the IEEE 802.1m system can be allocated after a DLRU index to which the uplink control channel of the IEEE 802.1e system is allocated. This is because the uplink control channel of the IEEE 802.1e system includes 3 OFDMA symbols, and it is difficult to schedule the remaining resource regions other than the 3 OFDMA symbols to the uplink control channel of the IEEE 802.1m system. A location of the uplink control channel of the IEEE 802.1m system can be transmitted by using broadcast information. The broadcast information can be transmitted by using an SFH or the like. The broadcast information can include at least one of a start point of each uplink control channel on a resource region and a size or order thereof on the resource region. If the size or order of each uplink control channel on the resource region is the same as that used in the 16m only mode, the broadcast information can include only start point information of each uplink control channel on the resource region. In case of the ranging channel of the IEEE 802.1m system, if boundary information is not reported by the SFH SP1, it can be fixed to a DLRU location corresponding to a last subchannel. Alternatively, a location of the uplink control channel of the IEEE 802.1m system can be fixed. For example, the location of the uplink control channel of the IEEE 802.1m system can be fixed according to the location of the ranging channel of the IEEE 802.1m system and the location of the data region.

When the ranging channel is allocated in decreasing order of indices from a last DLRU, the uplink control channel of the IEEE 802.1m system can be allocated in decreasing order of indices of DLRUs subsequently to the ranging channel.

Figure 12:
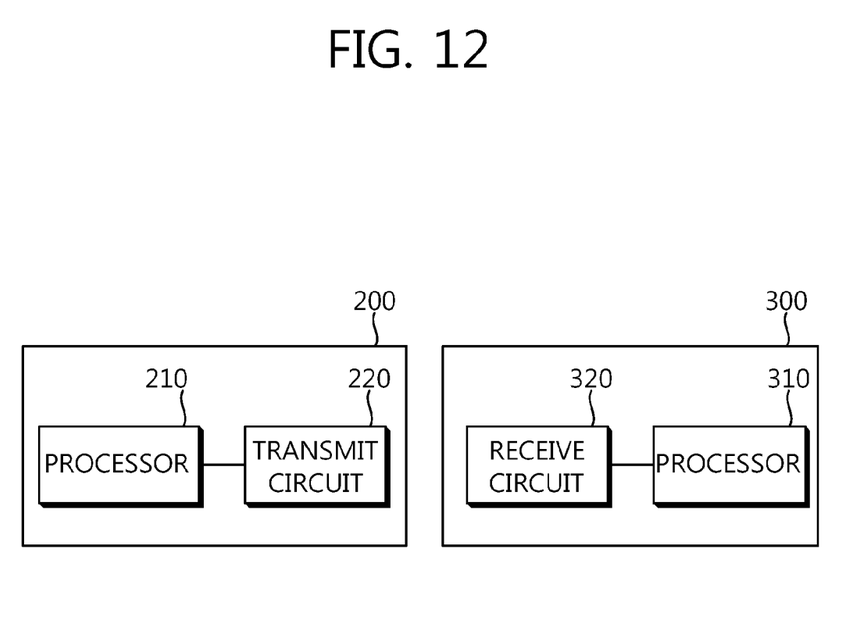
FIG. 12 is a block diagram showing structures of a BS and an MS for implementing an embodiment of the present invention.

FIG. 12 is a block diagram showing structures of a BS and an MS for implementing an embodiment of the present invention.

A transmitter 200 includes a processor 210 and a transmit circuit 220. The processor 210 implements the proposed functions, processes, and/or methods. The processor 210 generates allocation information of a ranging channel, allocation information of a feedback channel, and allocation information of a BRCH. The transmit circuit 220 transmits the allocation information of the ranging channel, the allocation information of the feedback channel, and the allocation information of the BRCH, and transmits and/or receives a radio signal.

A receiver 300 includes a processor 310 and a receive circuit 320. The receive circuit 320 receives the allocation information transmitted from the transmitter, i.e., the allocation information of the ranging channel, the allocation information of the feedback channel, and the allocation information of the BRCH, and transmits an uplink control signal through at least one of the ranging channel, the feedback channel, and the BRCH. The processor 310 configures the ranging channel, the feedback channel, and the BRCH in an uplink resource region based on the allocation information of the ranging channel, the allocation information of the feedback channel, and the allocation information of the BRCH.

According to the present invention, an uplink control channel is configured such that a plurality of uplink control channels are contiguous with one another in a resource region. Therefore, information required to configure the uplink control channel, i.e., a size of the uplink control channel, etc., can be transmitted to a minimum extent, thereby decreasing signaling overhead.

The present invention can be implemented using hardware, software, or a combination of them. In the hardware implementations, the present invention can be implemented using an application specific integrated circuit (ASIC), a digital signal processor (DSP), a programmable logic device (PLD), a field programmable gate array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of transmitting an uplink control signal of a mobile station (MS) in a wireless communication system, the method comprising:
    allocating a first uplink control channel resource to a first uplink control channel;
    allocating a second uplink control channel resource to a second uplink control channel;
    transmitting an uplink control signal through at least one of the first uplink control channel and the second uplink control channel,
    wherein the first uplink control channel resource is located in a first resource unit among a plurality of resource units constituting a logical resource region,
    wherein the first uplink control channel resource and the second uplink control channel resource are allocated in that order in the logical resource region,
    wherein the second uplink control channel comprises a feedback channel for transmitting uplink feedback and a bandwidth request channel (BRCH) for transmitting a bandwidth request signal, and
    wherein allocating the first uplink control channel resources and the second uplink control channel resources is preformed in an increasing order such that an index of a resource allocated to the feedback channel is less than an index of a resource allocated to the BRCH in the logical resource region.

2. The method of claim 1, wherein an index of the second uplink control channel resource is greater than an index of the first uplink control channel resource.

3. The method of claim 1, wherein:
    the feedback channel comprises a hybrid automatic repeat request (HARQ) feedback channel (HFBCH) for transmitting HARQ feedback and a fast feedback channel (FFBCH) for transmitting a channel quality indicator (CQI) or multiple-input multiple-output (MIMO) information; and
    an index of a resource allocated to the HFBCH is less than an index of a resource allocated to the FFBCH in the logical resource region.

4. The method of claim 1, wherein each of the plurality of resource units comprises 6 tiles, each of which comprises 4 consecutive subcarriers and 6 orthogonal frequency division multiple access (OFDMA) symbols.

5. The method of claim 1, further comprising:
    allocating an uplink data region to the logical resource region remaining after allocating the first uplink control channel resource and the second uplink control channel resource; and
    transmitting uplink data mapped to the uplink data region.

6. An apparatus for transmitting an uplink control signal in a wireless communication system, the apparatus comprising:
    a receiving circuit configured to transmit the uplink control signal through at least one of a first uplink control channel and a second uplink control channel; and
    a processor coupled to the receiving circuit and configured to allocate a first uplink control channel resource to the first uplink control channel and a second uplink control channel resource to the second uplink control channel,
    wherein the first uplink control channel resource is located in a first resource unit among a plurality of resource units constituting a logical resource region,
    wherein the first uplink control channel resource and the second uplink control channel resource are allocated in that order in the logical resource region,
    wherein the second uplink control channel comprises a feedback channel for transmitting uplink feedback and a bandwidth request channel (BRCH) for transmitting a bandwidth request signal, and
    wherein the processor is further configured to allocate the first uplink control channel resources and the second uplink control channel resources in an increasing order such that an index of a resource allocated to the feedback channel is less than an index of a resource allocated to the BRCH in the logical resource region.

7. The apparatus of claim 6, wherein an index of the second uplink control channel resource is greater than an index of the first uplink control channel resource.

8. The apparatus of claim 6,
    wherein the feedback channel comprises a hybrid automatic request (HARQ) feedback channel (HFBCH) for transmitting HARQ feedback and a fast feedback channel (FFBCH) for transmitting a channel quality indicator (CQI) or multiple input multiple output (MIMO) information, and
    wherein an index of a resource allocated to the HFBCH is less than an index of a resource allocated to the FFBCH in the logical resource region.

9. The apparatus of claim 6, wherein each of the plurality of resource units comprises 6 tiles, each of which comprises 4 consecutive subcarriers and 6 orthogonal frequency division multiple access (OFDMA) symbols.

* * * * *